Dec. 20, 1966 S. PETERSON 3,292,583
AUTOMATIC POULTRY NEST
Filed March 31, 1965 4 Sheets-Sheet 1

INVENTOR.
SEYMOUR PETERSON
BY
Merchant, Merchant & Gould
ATTORNEYS

Dec. 20, 1966  S. PETERSON  3,292,583
AUTOMATIC POULTRY NEST
Filed March 31, 1965  4 Sheets-Sheet 2
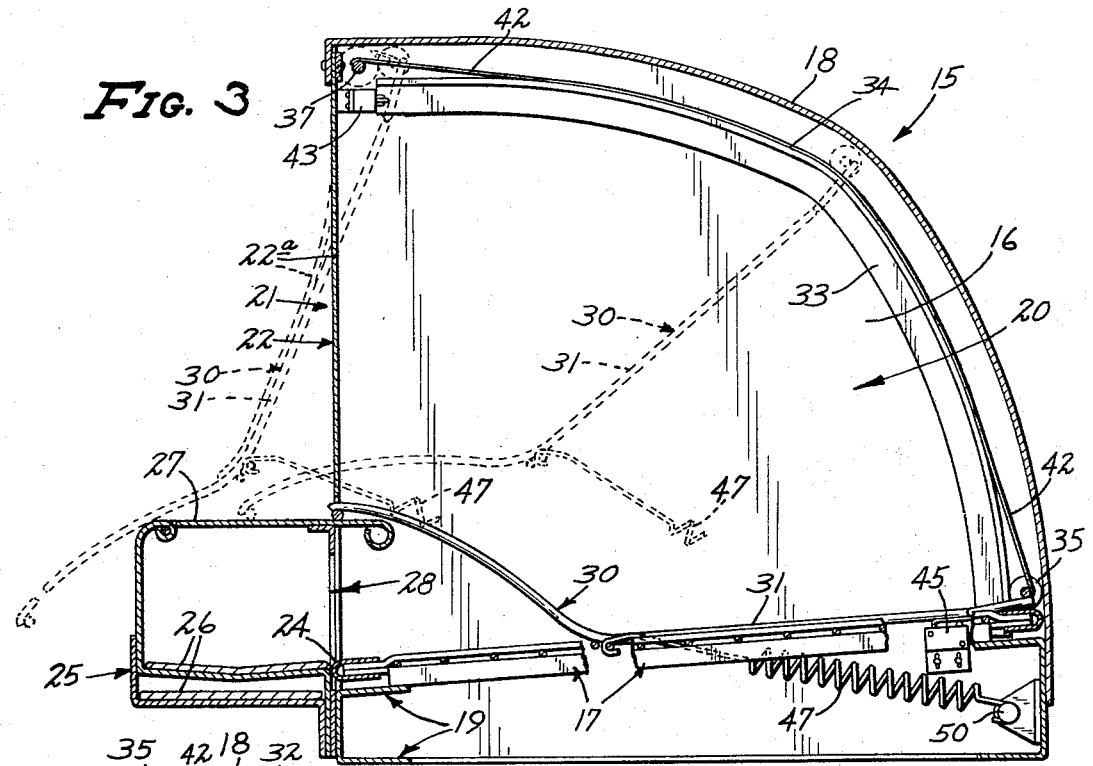
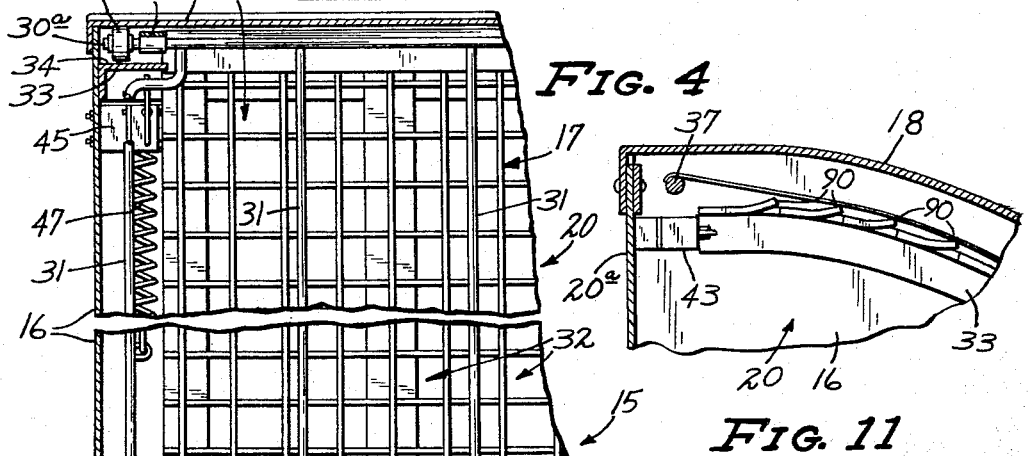
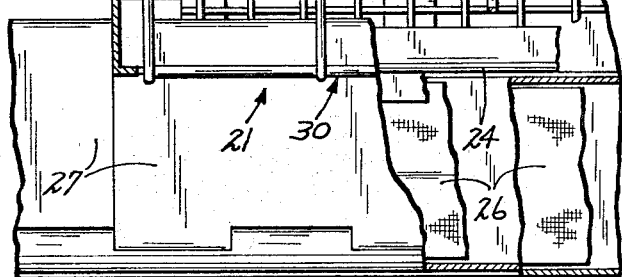
INVENTOR.
SEYMOUR PETERSON
BY
Merchant, Merchant & Gould
ATTORNEYS Dec. 20, 1966  S. PETERSON  3,292,583
AUTOMATIC POULTRY NEST
Filed March 31, 1965  4 Sheets-Sheet 3
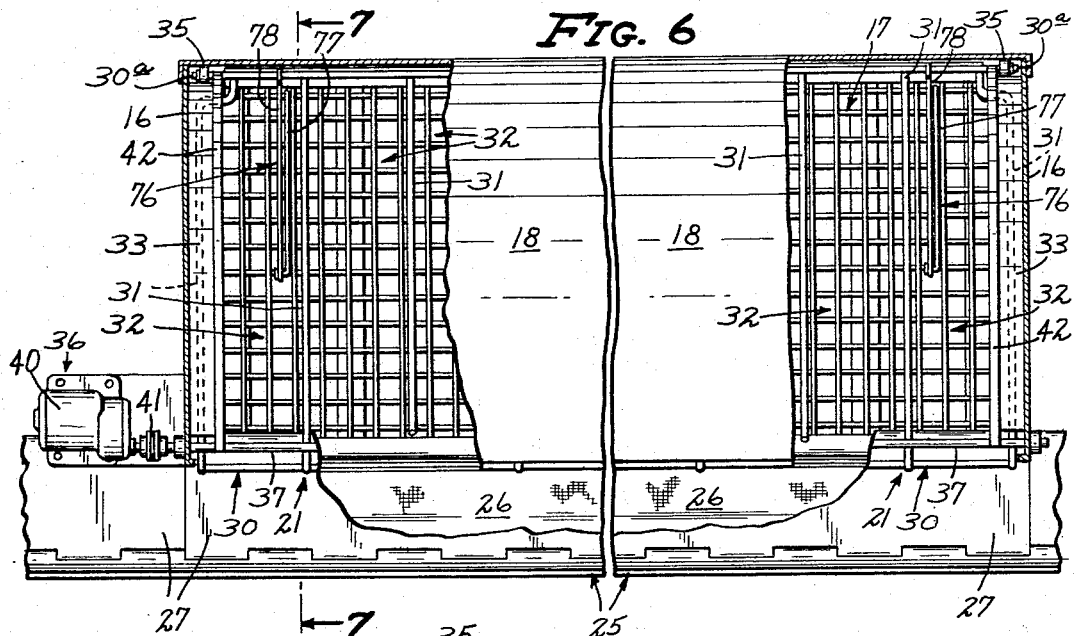
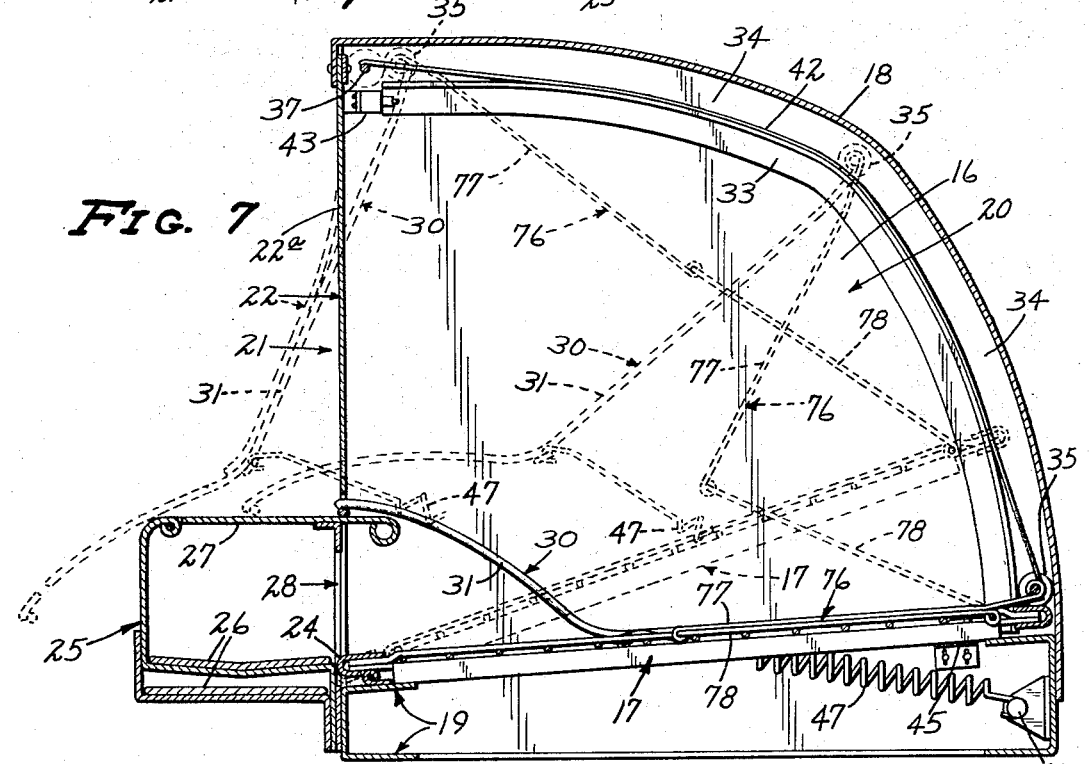
INVENTOR.
SEYMOUR PETERSON
BY
Merchant, Merchant & Gould
ATTORNEYS

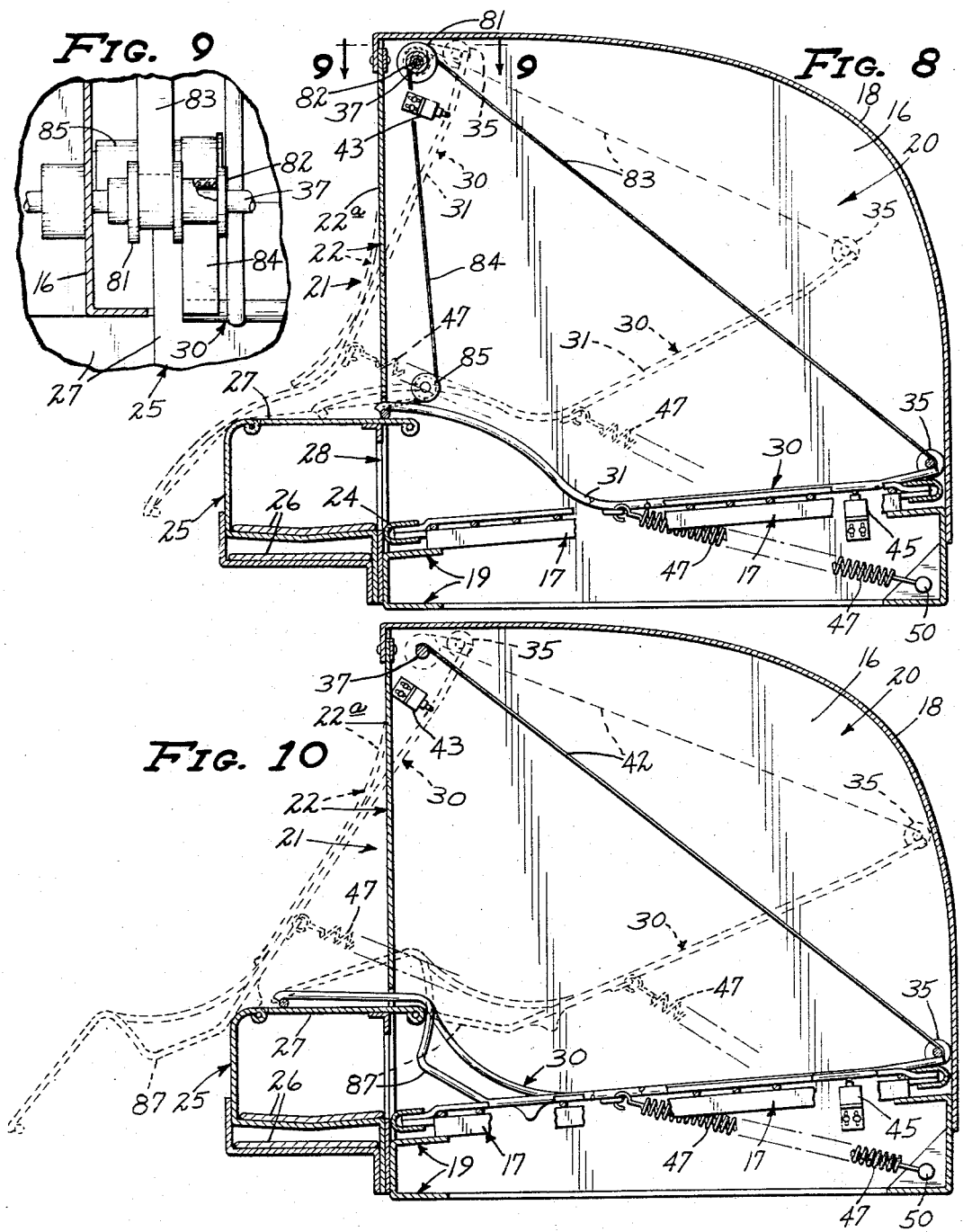

United States Patent Office 3,292,583
Patented Dec. 20, 1966

3,292,583
AUTOMATIC POULTRY NEST
Seymour Peterson, Dassel, Minn., assignor to Storm Industries, Inc., Dassel, Minn., a corporation of Minnesota
Filed Mar. 31, 1965, Ser. No. 444,260
18 Claims. (Cl. 119—45)

This invention pertains to poultry nest construction, and more particularly to a poultry nest comprising a nesting chamber having a movable element mounted therein which periodically sweeps poultry from the nest and which further forms a barrier at the open front of the nest to prevent re-entry of the poultry for a predetermined period. The present invention is an improvement of the poultry nest shown in co-pending patent applications Serial Nos. 306,932, filed September 5, 1963, entitled "Automatic Egg Nest"; 431,658, filed February 10, 1965, and entitled "Poultry Nest Construction"; and United States Patent 3,157,156, issued November 17, 1964, all of which are assigned to the same assignee as the present invention.

The poultry and egg producing business is becoming more automated every day to where, at the present time, one poultryman may have under his care and responsibility as many as 50,000 or more hens. The present invention, as well as the inventions disclosed in the aforementioned co-pending patent applications and patent, are particularly well suited for use in large automated egg producing facilities. For example, these poultry nests are constructed so that the hens will be allowed entry into the nests during the hen laying periods, but the nests will automatically eject the hen after the egg laying period and will form a barrier at the open front of the nest to prevent the hens' re-entry thereto. By preventing entry of the hens to the nest during the roosting periods, the nests are maintained in a much cleaner state and hence result in a greatly decreased care and cleaning time for the poultry supervisor. In addition, much cleaner eggs are produced and egg breakage is greatly decreased.

Basically, the poultry nests of the type to which the present invention pertains, comprise a nesting chamber having an open front and a nest-forming bottom wall which tilts toward a marginal delivery edge thereof. The delivery edge of the bottom wall may be adjacent the open front of the nesting chamber. When a hen lays an egg in the nest, the egg gently rolls down the tilted bottom wall toward the marginal delivery edge thereof. An egg collection system is mounted adjacent the delivery edge of the tilted bottom wall, and the eggs roll into the egg collection system and are carried to a cleaning and packaging area by means of a conveyor belt which forms part of the egg collection system. The egg collection structure or system is normally completely enclosed by a cover except for the portion facing into the nest and through which the eggs enter the egg collection structure. The purpose of the cover is to prevent the hens in the poultry house and in the nests from gaining access to the eggs once the eggs are in the egg collection structure. Since the conveyor belt portion of the egg collection structure is usually at the same level as the delivery edge of the nest-forming bottom wall, the cover which encloses the egg collection structure normally extends above the nest-forming bottom wall and partially blocks the open front of the nesting chamber. The blocking of the open front of the nesting chamber by the egg collection structure creates a very serious problem in the use of this type poultry nest, since in many cases when the sweep-barrier element moves from a nesting position to a barrier position at the front of the nesting chamber, a hen in the nesting chamber will become trapped between the sweep element and the collection structure and may thereby be injured or killed. Another problem which has been discovered in the use of poultry nests of the type previously described is that in many instances a hen will die in the nesting chamber, and when the sweep element subsequently operates the dead hen will slide down the sweep element and lodge between the sweep element and the egg collection structure thereby jamming the sweep element. Furthermore, in many instances the movement of the sweep-barrier element will force the dead hen into the egg collection structure thereby causing a tremendous amount of egg breakage. If the sweep element has not closed sufficiently to form a barrier at the open front of the nesting chamber, other hens in the poultry house will enter the nest to roost, and during the next laying period when the sweep element is subsequently lowered to its nesting position, many of these hens will be trapped beneath the sweep element and be injured or killed.

When the prior art poultry nests are used, it is necessary after the sweep element has moved to its barrier position and has ejected the hens from the nests, for the poultryman to inspect each of the nests to see that a hen is not trapped in the nest, or that a hen has not died in the nest and is jamming the sweep element structure. Since, as mentioned previously, one poultryman may have responsibility for upwards of 50,000 hens, it has become necessary for him to eject the hens much earlier in the day so he has sufficient time to inspect all of the nests. This type of operation seriously shortens the laying period and hence the efficiency of the automated poultry nest. In addition, the early ejection of the hens from the poultry nest results in a greatly increased number of eggs being laid in the floor area.

The present invention provides a poultry nest wherein the hens in the nests are prevented from being trapped between the rising sweep element and the egg collection structure, and also, wherein the sweep element will positively eject the hens from the nesting chamber regardless of whether the hen is dead or alive.

Basically, the present invention comprises a nesting chamber having a nest-forming bottom wall which tilts towards a marginal delivery edge thereof. An egg collection structure is mounted adjacent to the delivery edge of the nest-forming bottom wall. A sweep-barrier element is mounted in the nesting chamber and extends between the side walls thereof, the sweep-barrier element generally overlying the nest-forming bottom wall. The sweep-barrier element comprises a plurality of spaced tines, the spaced tines defining apertures which are large enough to allow eggs to pass therethrough but which are small enough so that poultry cannot pass through the apertures. The front end, or the end of the sweep element adjacent the egg collection structure, extends angularly upwardly and overlies the cover of the egg collection structure. A suitable drive mechanism is connected to the sweep-barrier element and periodically causes the sweep-barrier element to move from a nesting position to a barrier-forming position at the open front of the nesting enclosure. The drive means imparts a combined rotational and translational movement to the sweep-barrier element so that as the element is rotated upwardly to its barrier-forming position, it also moves outwardly over the egg collection structure to a position where the sweep-barrier element extends outside of the egg collection structure. In this manner, a hen which may have died in the nesting chamber will be lifted over the egg collection structure and will slide off the sweep-barrier element onto the poultry house floor where it can be disposed of by the poultryman at his leisure. In addition, since the sweep-barrier element extends angularly upwardly and overlies the cover of the egg collection structure, as the sweep-barrier element moves into its barrier-forming position, a hen cannot become trapped between the sweep-barrier element and the egg collection structure.

In a further embodiment of the present invention, as the sweep-barrier element is moved to its barrier-forming position, a bouncing or vibrating motion is imparted to the sweep-barrier element so that if a dead hen or other debris is stuck to the element, the vibrating or bouncing motion will cause it to dislodge.

In a further embodiment of the present invention, the sweep-barrier element is linked to the nest-forming bottom wall of the nesting chamber so that as the sweep-barrier element moves to its barrier-forming position, the angle of tilt of the nest-forming bottom is increased to insure that all of the eggs in the nesting chamber will roll off the nest-forming bottom into the egg collection structure.

It is one object of this invention, therefore, to provide an improved poultry nest construction.

Another object of this invention is to provide a poultry nest construction having a sweep-barrier element which will positively eject hens from the nesting chamber regardless of whether the hens are alive or dead.

A further object of this invention is to provide a poultry nest construction having a sweep-barrier element wherein hens are prevented from being trapped in the nesting chamber upon movement of the sweep-barrier element.

These and other objects of this invention will become apparent to those skilled in the art upon consideration of the accompanying specification, claims, and drawings.

Referring to the drawings, wherein like characters indicate like parts throughout the several views:

FIG. 3 is an enlarged view in vertical section as seen from lines 3—3 of FIG. 1;

FIG. 4 is an enlarged view in horizontal section as seen from the lines 4—4 of FIG. 1, portions thereof being broken away and shown in section;

FIG. 6 is a top plan, parts thereof being broken away and shown in section, of a second embodiment of the present invention;

FIG. 7 is an enlarged sectional view as seen from the line 7—7 of FIG. 6;

FIG. 8 is a view similar to FIG. 3 showing a further embodiment of the present invention;

FIG. 9 is a horizontal sectional view as seen from the lines 9—9 of FIG. 8, parts thereof being broken away and shown in section;

FIG. 10 is a view similar to FIG. 3 showing a still further embodiment of the present invention; and FIG. 11 is an enlarged view in vertical section of a modification for a guide means of the present invention.

Figure 1:
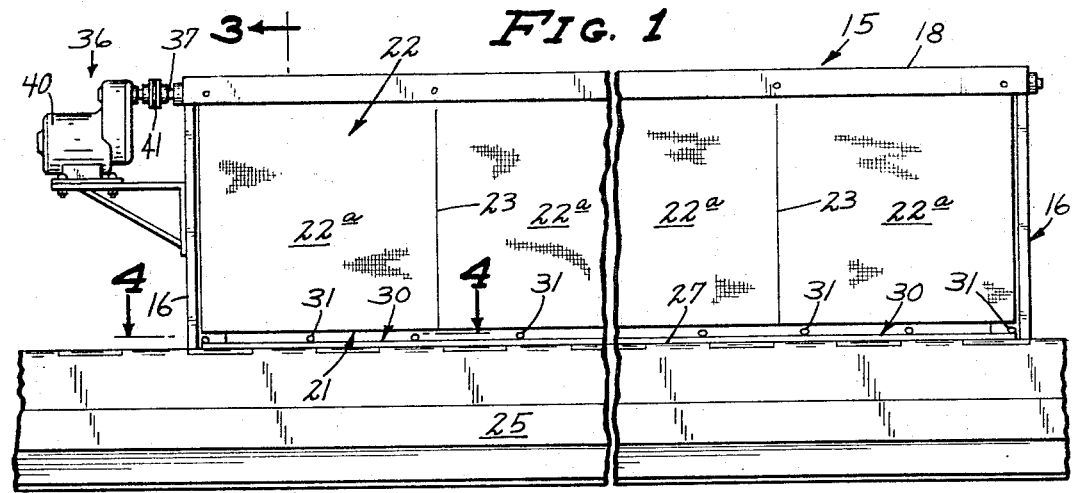
FIG. 1 is a front elevational view of a poultry nest of the present invention.
Figure 2:
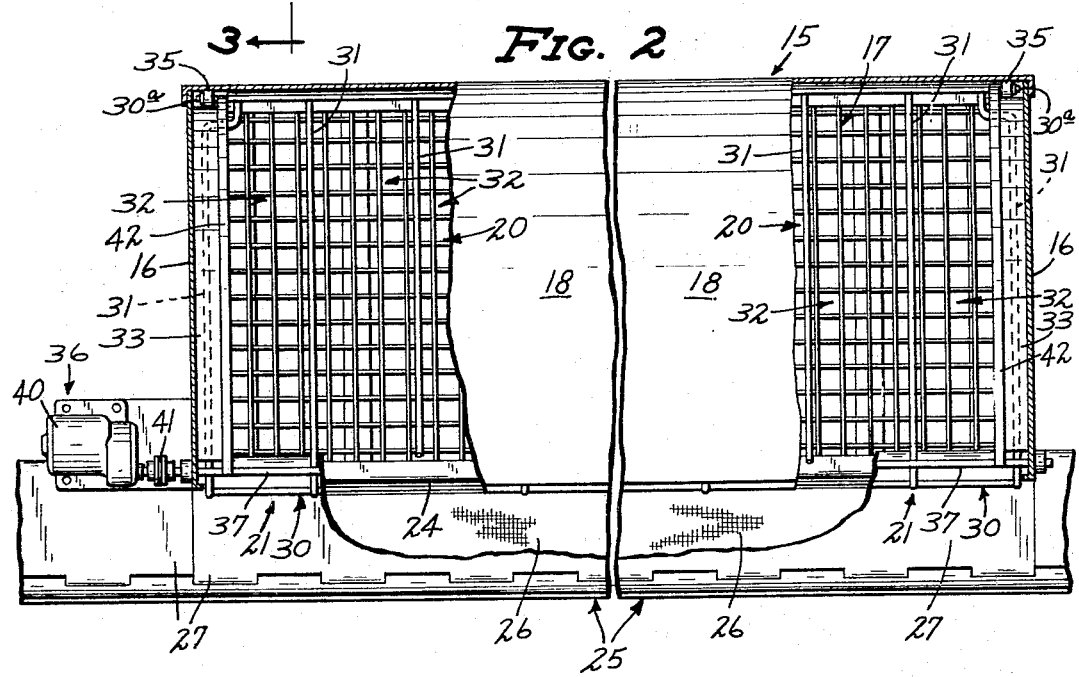
FIG. 2 is a top plan of the poultry nest of FIG. 1, parts thereof being broken away and shown in section.

Referring with greater particularity to the drawings, and initially to the embodiment shown in FIGS. 1–5, inclusive, there is shown a poultry house or nest 15 having opposed side walls 16, a bottom wall 17, a curved element 18 which forms a rear and a top wall and a base 19 to support the bottom wall 17. The walls of the nest 15 jointly cooperate to define a nesting chamber 20 having an open front 21. The open front 21 is normally provided with a depending fabric curtain 22, which, as shown in FIG. 1, is provided with longitudinally spaced slits 23 which separate the curtain 22 into a plurality of curtain section 22a. The screen-like bottom wall 17 slants, or tilts, forwardly from the rear wall 18 to a marginal delivery edge 24 of bottom wall 17, the marginal delivery edge 24 of wall 17 being adjacent the open front 21 of nest 15.

An egg collection structure 25 comprises a double course conveyor belt 26 which is mounted adjacent the delivery edge 24 of bottom wall 17 so that when a hen lays an egg on the bottom wall 17, the egg will roll, under the action of gravity, onto the conveyor belt 26 of the egg collection structure 25. The conveyor belt 26 then carries the egg to a cleaning and packaging area. The egg collection structure 25 includes a cover 27 which completely encloses the conveyor belt 26 except for an opening 28 which opens into the nesting chamber 20 and through which the eggs enter the egg collecting structure 25.

A sweep-barrier element 30 extends between the side walls 16 of the nest-forming chamber 20 and generally overlies the nest-forming bottom 17. Sweep-barrier element 30 comprises a plurality of spaced tines or rods 31 which define a plurality of apertures, or passages, 32. The apertures 32 between spaced tines 31 are sufficiently large to allow eggs to pass therethrough; however, the apertures 32 are not large enough to allow a hen to pass between the spaced tines 31. The front end of the sweep-barrier element adjacent the open front 21 of the nest 15 extends angularly upwardly and overlies the cover 27 of the egg collection structure 25.

A generally L-shaped member 33 is mounted to the inner surface of each of the side walls 16 and extends in an upward and forward direction from the rear of the nesting chamber 20 toward the open front thereof, member 33 forming a guide means or path 34 for the rear end of the sweep-barrier element 30 adjacent the rear wall 18 of the nest 15. The rear end of the sweep-barrier element 30 is mounted in each of the guide paths 34 by means of a roller 35 one each of which is mounted on trunnions 30a formed on each rear side of the sweep-barrier element 30 and rides on the extending surface of the L-shaped member 33.

A drive mechanism 36 comprises a shaft 37 which extends horizontally through the side walls 16 of nest 15 at the upper forward corners thereof. Shaft 37 is mounted for rotation and is driven by a motor 40 through a slip clutch 41. A flexible belt 42 has one end thereof connected to shaft 37 adjacent the inner surface of wall 16, and the other end thereof connected to the rear end of the sweep-barrier element 30. A second belt 42 has one end connected to the opposite end of shaft 37 adjacent the inner surface of the other wall 16, and the other end is connected to the rear end of sweep-barrier element 30. A first switch 43 is mounted to the inner surface of wall 16 near the upper forward corner thereof, switch 43 having a movable contact 44 which engages the sweep-barrier element 30 when the sweep-barrier element is in its barrier-forming position at the open front of nest 15. A second switch 45 is mounted to the inner surface of wall 16 adjacent the lower rear corner thereof, switch 45 having a movable contact 46 which engages the sweep-barrier element 30 when the sweep-barrier element is in its nesting position overlying the nest-forming bottom 17 of nest 15. The switches 43 and 45 are connected to control the operation of motor 40 as will be described hereinafter.

A spring 47 has one end thereof connected to one side of the sweep-barrier element 30 and the other end thereof connected to a projecting ear 50 which projects outwardly from the lower inner corner of the rear wall element 18. A second spring 47 (not shown) is similarly connected to the other side of the sweep-barrier element 30. The springs 47 are biased such as to hold the sweep-barrier element 30 in a position overlying the nest-forming bottom 17 of nest 15.

The operation of the present invention is as follows: At a predetermined time determined by a suitable timer to be described hereinafter, motor 40 is energized and causes shaft 37 to rotate. As shaft 37 rotates, the flexible belt 42 winds thereon and overcomes the bias of spring 47 thereby causing the sweep-barrier element 30 to move in an upward and forward direction along the guide path 34. As the sweep-barrier element 30 is moved by the belt 42, the sweep-barrier element 30 rotates upwardly and translates forwardly to a position where the sweep-barrier element 30 forms a barrier at the open front 21 of nest 15 as shown by the dotted line positions of FIG.

3. Since the forward end of the sweep-barrier element 30 extends angularly upwardly and overlies the cover 27 of the egg collection structure 25, as the sweep-barrier element moves it rides over the cover 27 of the egg collection structure 25 to the barrier-forming position wherein the front of the sweep-barrier element extends outwardly from the egg collection structure 25. Movement of the sweep-barrier element 30 causes a hen in the nest to rise with the sweep-barrier element and to be ejected from the nest 15. The angularly inclined forward end of the sweep-barrier element 30 further acts as a guard to prevent a hen from reaching the inside of the egg collection structure 25 and also prevents a dead hen from becoming wedged between the movable sweep-barrier element 30 and the egg collection structure 25. If the hen is dead in the nest when the element 30 moves to its barrier-forming position, the dead hen will merely be lifted up by the movable element 30 and will slide off onto the floor of the poultry house where it is readily seen and removed by the poultryman.

Figure 5:
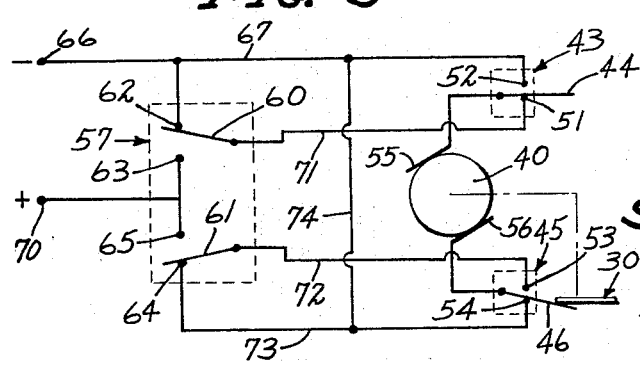
FIG. 5 is a schematic diagram of the motor and timer portion of the present invention.

Referring to FIG. 5, there is shown the schematic of the electrical circuit used to activate the sweep-barrier element 30 of the nest 15. FIG. 5 shows the switches 43 and 45 along with their movable contacts 44 and 46, respectively. In addition, switch 43 has a first fixed contact 51 and a second fixed contact 52, while switch 45 has a first fixed contact 53 and a second fixed contact 54. The movable contact 44 of switch 53 is biased so that it normally engages the fixed contact 51, while the movable contact 46 of switch 45 is biased so that it normally engages the fixed contact 53. FIG. 5 further shows motor 40 having brush terminals 55 and 56, and in addition shows a timer 57 having movable contacts 60 and 61. A fixed contact 62 and a fixed contact 63 are associated with movable contact 60 while a fixed contact 64 and a fixed contact 65 are associated with movable contact 61. Movable contact 60 of timer 57 normally engages the fixed contact 62, while the movable contact 61 normally engages the fixed contact 64. The movable contacts 60 and 61 of timer 57 are adapted to be moved into engagement with their fixed contacts 63 and 65, respectively, by means of a timing cam (not shown) which moves contacts 60 and 61 into engagement with contacts 63 and 65, respectively, for a relatively short time at different periods of the day. During the period of the day when it is desired to eject the hens from the nest, the timer will move movable contact 60 into engagement with fixed contact 63 for a period long enough to allow the motor 40 to move the sweep-barrier element 30 into its barrier-forming position, while during the period of the day that it is desired to open the nests to the hens for laying, the timer will move contact 61 into engagement with fixed contact 65 for a long enough time for the motor 40 to move the sweep-barrier element to its nesting position overlying the nest-forming bottom 17 of nest 15. A negative terminal 66 of an energizing potential source is connected by means of a conductor 67 to the fixed contact 52 of switch 43, while a positive terminal 70 of the energizing potential source is connected to the fixed contacts 63 and 65 of timer 57. The movable contact 60 of timer 57 is connected by means of a conductor 71 to the fixed contact 51 of switch 43, while the movable contact 61 of timer 57 is connected by means of a conductor 72 to the fixed contact 53 of switch 45. The fixed contact 64 of timer 57 is connected by means of a conductor 73 to the fixed contact 54 of switch 45. The movable contact 44 is connected to the brush terminal 55 of motor 40, while the movable contact 46 of switch 45 is connected to the brush terminal 56 of motor 40. A conductor 74 is connected between the conductors 67 and 73.

As shown in FIG. 5, the sweep-barrier element 30 is in its nesting position overlying the nest-forming bottom 17 of nest 15, and the motor 40 is de-energized since the positive terminal 70 of the energizing potential source is open circuited. The timer 57 is set so that at the period of the day when it is desired to eject the hens from the nest 15, the movable contact 60 is moved into engagement with fixed contact 63 and the motor 40 is energized by means of the circuit from the positive terminal 70 of the potential source through movable contact 60 of timer 57, conductor 71, fixed contact 51 and movable contact 44 of switch 43, brush terminal 55, motor 40, brush terminal 56, movable contact 46 and fixed contact 54 of switch 45, conductor 73, conductor 74, and conductor 67 to the negative terminal 66 of the energizing potential source. The energization of motor 40 will cause the motor to rotate thereby moving the sweep-barrier element 30 to its barrier-forming position at the open front of the nest 15. As the sweep-barrier element 30 moves out of engagement with movable contact 46 of switch 45, the movable contact 46 will move into engagement with fixed contact 53, however, this will not stop motor 40 since the circuit is now completed through conductor 72, movable contact 61 and fixed contact 64 of timer 57, conductor 73, conductor 74, and conductor 67 to the negative terminal 66. When sweep-barrier element 30 is in its barrier-forming position, the element 30 will engage movable contact 44 of switch 43 and will cause contact 44 to engage fixed contact 52 of switch 53. The movement of contact 44 will open the circuit to motor 40 and the motor will stop. The timer 57 is so adjusted that a short time after the sweep-barrier element reaches its barrier-forming position, the movable contact 60 of timer 57 will be released and will return to engagement with fixed contact 62.

The timer 57 is further set so that when it is time for the next laying period, the timer will move movable contact 61 into engagement with fixed contact 65 and a circuit will be completed from the positive terminal 70 through fixed contact 65 and movable contact 61 of timer 57, conductor 72, fixed contact 53 and movable contact 46 of switch 45, the brush terminal 56, motor 40, and brush terminal 55, movable contact 44 and fixed contact 52 of switch 43, and conductor 67 to the negative terminal 66. Motor 40 will now rotate in the opposite direction, and the spring 47 will move the barrier 30 to its nesting position overlying the nest-forming bottom 17 of nest 15. When the sweep-barrier element 30 reaches its nesting position, it engages the movable contact 46 of switch 45 and breaks the circuit between contact 46 and contact 53 thereby de-energizing motor 40. Sometime after the sweep-barrier element 30 reaches its nesting position, the timer will release movable contact 61 and contact 61 will return to engagement with fixed contact 64. The cycle is now in position to repeat.

Referring to FIGS. 6 and 7, there is shown a second embodiment of the present invention wherein the nest-forming bottom 17 rests on the base 19 and is free to be lifted therefrom. A link element 76 comprises a first arm 77 and a second arm 78. Arm 77 of link 76 has one end connected to the left rear end of the sweep-barrier element 30, and its other end pivotally connected to one end of arm 78. The other end of arm 78 is connected to the left rear end of the nest-forming bottom 17. Another link element 76, substantially identical to the link element 76 previously described, is connected between the right rear end of the sweep-barrier element 30 and the nest-forming bottom 17. When the sweep-barrier element 30 is in its nesting position overlying the nest-forming bottom 17, the arms 77 and 78 of the linking element 76 fold together and rest on top of the nest-forming bottom 17. When the sweep-barrier element 30 is moved to its barrier-forming position at the open front of nest 15, the arms 77 and 78 of link element 76 unfold to an extended position, and the length of each of the arms 77 and 78 is chosen such that when the sweep-barrier element 30 reaches its final barrier-forming position, the link element 76 will raise the rear end of the nest-forming bottom 17 off of the base 19 and thereby increase the tilt of the nest-forming bottom 17. In this manner, any eggs that may be stuck on the nest-forming bottom, or which have not already rolled into the egg collection structure 25, will be forced to roll down the nest-forming bottom and onto the conveyor 26 of the egg collection structure 25.

Referring to FIGS. 8 and 9, there is shown a further embodiment of the present invention wherein the guide track 33 for the rear end of the sweep-barrier element 30 has been removed, and wherein a first drive or take-up wheel 81 and a second take-up wheel 82 have been mounted on the shaft 37 adjacent the inner surfaces of the end walls 16 of the nest 15. The take-up wheel 81 has a predetermined peripheral circumference which is greater than that of the take-up wheel 82. A flexible belt 83 has one end connected to the take-up wheel 81 and the other end connected to the rear side of the sweep-barrier element 30. A second flexible belt 84 has one end connected to the front side of the sweep-barrier element 30, while the other end of belt 84 is wound around and connected to the second take-up wheel 82. As can be seen from FIG. 8, the direction of movement of flexible belt 84 is changed from a generally vertical direction as it leaves the take-up wheel 82, to a generally horizontal direction where it is connected to the front end of the sweep-barrier element 30 by means of a guide wheel 85 which is mounted to the side wall 16 of the nest 15. The take-up wheels 81 and 82 are fixedly mounted to shaft 37 for rotation therewith, so that as shaft 37 rotates in one direction, the belt 83 is wound onto the take-up wheel 81 and the sweep-barrier element 30 is caused to rotate toward a generally vertical position. As the belt 83 is being wound onto the take-up wheel 81, the belt 84 is unwinding from the take-up wheel 82. However, since the circumference of take-up wheel 81 is greater than that of take-up wheel 82, belt 83 will be wound onto wheel 81 at a faster rate than belt 84 will unwind from wheel 82; hence, the rear end of sweep-barrier element 30 will rotate toward a generally vertical position faster than the front end of the sweep-barrier element will translate outwardly throught the open front 21 of the nest 15.

When the motor is again energized to return the sweep-barrier element 30 to its nesting position, under the bias of spring 47, the motor will drive shaft 37 in the opposite direction and the belt 83 will unwind from the take-up wheel 81 while the belt 84 will wind up onto the take-up wheel 82. The action of the belts 83 and 84 will cause the sweep-barrier element 30 to rotate toward a generally horizontal position and also to translate inwardly through the open front 21 of nest 15 to a final nesting position wherein the sweep-barrier element 30 is generally overlying the nest-forming bottom 17 of the nest 15.

FIG. 10 shows a still further embodiment of the present invention wherein the guide means 33 has been removed, and wherein a stop means has been connected to the front end of the sweep-barrier element 30 to engage the egg collection structure 25 to prevent forward translational movement of the sweep-barrier element 30 until the element has rotated through a predetermined angle. As shown in FIG. 10, the stop means can be formed by deforming certain of the tines of the sweep-barrier element 30 as shown at 87, the deformed tines 87 engaging or hooking an extended portion of the cover 27 of the egg collection structure 25. As the shaft 37 is rotated by the motor 40 (not shown) the flexible belt 42 winds up on shaft 37 and causes an upward rotational movement of the sweep-barrier element 30. However, since the tines 87 are engaging the cover 27 of the egg collection structure 25, the sweep-barrier element 30 cannot move in a forward direction until the sweep-barrier element 30 has rotated sufficiently to raise the stop element 87 out of engagement with the cover 27 of the egg collection structure 25. At this time the sweep-barrier element 30 will continue to rotate to a generally vertical position and will also translate forwardly outward of the nesting chamber 20 to where the forward end of the sweep-barrier element 30 extends outwardly of the egg collection structure 25.

From the above description it can be seen that in both of the embodiments disclosed in FIGS. 8, 9 and 10, suitable means are provided to limit the forward translational movement of the sweep-barrier element 30 until this element has rotated at least through a predetermined angle.

FIG. 11 shows a modification of the guide means 33, wherein a plurality of saw-toothed edges 90 are formed at the upper forward end of the guide means 33 so that as the wheel 35, attached to the rear end of the sweep-barrier element 30, rotates over the saw-toothed edges 90 a vibratory or bouncing motion is imparted to the sweep-barrier element 30. This bouncing motion tends to dislodge a dead hen or other foreign matter which may be stuck to the sweep-barrier element.

It is to be understood that while there has been shown specific embodiments of the present invention, that these are for the purposes of illustration only, and that this invention is to be limited solely by the scope of the appended claims.

I claim as my invention:

1. A poultry nest comprising:
   (a) opposite side, rear, and nest-forming bottom walls which cooperate to define a nesting chamber having an open front, said nest-forming bottom wall tilting toward a marginal delivery edge thereof adjacent the open front of said chamber;
   (b) an egg collection structure mounted adjacent the delivery edge of said nest-forming bottom wall, said egg collection structure having a cover which partially blocks the open front of said chamber;
   (c) a sweep-barrier element extending between the side walls of said chamber and generally overlying the nest-forming bottom wall, the front end of said sweep-barrier element adjacent the open front of said chamber extending angularly upwardly and overlying the cover of said egg collection structure;
   (d) said sweep-barrier element defining apertures for the passage of eggs therethrough but which prevent the passage of poultry therethrough;
   (e) guide means mounted to extend in an upwardly and forwardly path from the rear of said chamber toward the open front thereof;
   (f) means mounting the rear end of said sweep-barrier element, adjacent the rear of said chamber, for movement along the path of said guide means;
   (g) drive means connected to said sweep-barrier element to periodically move the rear end of said element along the path of said guide means from a first position, generally overlying said nest-forming bottom wall, to a second position, forming a barrier at the open front of said chamber, and to periodically return said element to its first position.

2. A poultry nest comprising:
   (a) opposite side, rear, and nest-forming bottom walls which cooperate to define a nesting chamber having an open front, said nest-forming bottom wall tilting toward a marginal delivery edge thereof;
   (b) an egg collection structure mounted adjacent the delivery edge of said nest-forming bottom wall;
   (c) a sweep-barrier element extending between the side walls of said chamber and generally overlying the nest-forming bottom wall;
   (d) said sweep-barrier element defining apertures for the passage of eggs therethrough but which prevent the passage of poultry therethrough;
   (e) guide means mounted to extend in an upwardly and forwardly path from the rear of said chamber toward the open front thereof;
   (f) means mounting the rear end of said sweep-barrier element, adjacent the rear of said chamber, for movement along the path of said guide means;
   (g) drive means connected to said sweep-barrier element to periodically move the rear end of said element along the path of said guide means from a first position, generally overlying said nest-forming bottom wall, to a second position, forming a barrier at the open front of said chamber, and to periodically return said element to its first position.

3. A poultry nest comprising:
(a) opposite side, rear, and nest-forming bottom walls which cooperate to define a nesting chamber having an open front, said nest-forming bottom wall tilting toward a marginal delivery edge thereof adjacent the open front of said chamber;
(b) an egg collection structure mounted adjacent the delivery edge of said nest-forming bottom wall, said egg collection structure having a cover which partially blocks the open front of said chamber;
(c) a sweep-barrier element extending between the side walls of said chamber and generally overlying the nest-forming bottom wall, the front end of said sweep-barrier element adjacent the open front of said chamber extending angularly upwardly and overlying the cover of said egg collection structure;
(d) said sweep-barrier element defining apertures for the passage of eggs therethrough but which prevent the passage of poultry therethrough;
(e) guide means mounted to extend in an upwardly and forwardly path from the rear of said chamber toward the open front thereof; and
(f) means mounting the rear end of said sweep-barrier element, adjacent the rear of said chamber, for movement along the path of said guide means.

4. A poultry nest comprising:
(a) opposite side, rear, and nest-forming bottom walls which cooperate to define a nesting chamber having an open front, said nest-forming bottom wall tilting toward a marginal delivery edge thereof;
(b) an egg collection structure mounted adjacent the delivery edge of said nest-forming bottom wall;
(c) a sweep-barrier element extending between the side walls of said chamber and generally overlying the nest-forming bottom wall;
(d) said sweep-barrier element defining apertures for the passage of eggs therethrough but which prevent the passage of poultry therethrough;
(e) guide means mounted to extend in an upwardly and forwardly path from the rear of said chamber toward the open front thereof; and
(f) means mounting the rear end of said sweep-barrier element, adjacent the rear of said chamber, for movement along the path of said guide means.

5. A poultry nest comprising:
(a) opposite side, rear, and nest-forming bottom walls which cooperate to define a nesting chamber having an open front;
(b) a sweep-barrier element extending between the side walls of said chamber and generally overlying the nest-forming bottom wall;
(c) said sweep-barrier element defining apertures for the passage of eggs therethrough but which prevent the passage of poultry therethrough;
(d) guide means mounted to extend in an upwardly and forwardly path from the rear of said chamber toward the open front thereof;
(e) means mounting the rear end of said sweep-barrier element, adjacent the rear of said chamber, for movement along the path of said guide means;
(f) drive means connected to said sweep-barrier element to periodically move the rear end of said element along the path of said guide means from a first position, generally overlying said nest-forming bottom wall, to a second position, forming a barrier at the open front of said chamber, and to periodically return said element to its first position.

6. A poultry nest comprising:
(a) opposite side, rear, and nest-forming bottom walls which cooperate to define a nesting chamber having an open front, said nest-forming bottom wall tilting toward a marginal delivery edge thereof;
(b) a sweep-barrier element extending between the side walls of said chamber and generally overlying the nest-forming bottom wall;
(c) said sweep-barrier element defining apparatus for the passage of eggs therethrough but which prevent the passage of poultry therethrough;
(d) means connected to said sweep-barrier element to periodically move said element from a first position, generally overlying said nest-forming bottom wall, to a second position, forming a barrier at the open front of said chamber, and to periodically return said element to its first position; and
(e) means connected to said sweep-barrier element and said nest-forming bottom wall to increase the angle of tilt of said nest-forming bottom wall as said sweep-barrier element moves from its first position to its second position.

7. A poultry nest comprising:
(a) opposite side, rear, and nest-forming bottom walls which cooperate to define a nesting chamber having an open front, said nest-forming bottom wall tilting toward a marginal delivery edge thereof adjacent the open front of said chamber;
(b) an egg collection structure mounted adjacent the delivery edge of said nest-forming bottom wall, said egg collection structure having a cover which partially blocks the open front of said chamber;
(c) a sweep-barrier element extending between the side walls of said chamber and generally overlying the nest-forming bottom wall, the front end of said sweep-barrier element adjacent the open front of said chamber extending angularly upwardly and overlying the cover of said egg collection structure;
(d) said sweep-barrier element defining apertures for the passage of eggs therethrough but which prevent the passage of poultry therethrough;
(e) stop means connected to said sweep-barrier element and engaging the cover of said egg collection structure, said stop means preventing forward translational movement of said sweep-barrier element until said element has rotated through a predetermined angle; and
(f) drive means connected to the rear end of said sweep-barrier element, adjacent the rear of said chamber, and extending in an upwardly and forwardly direction from the rear of said chamber toward the open front thereof, said drive means periodically moving the rear end of said element from a first position, generally overlying said nest-forming bottom wall, to a second position, forming a barrier at the open front of said chamber, and periodically returning said element to its first position.

8. A poultry nest comprising:
(a) opposite side, rear, and nest-forming bottom walls which cooperate to define a nesting chamber having an open front;
(b) a sweep-barrier element extending between the side walls of said chamber and generally overlying the nest-forming bottom wall;
(c) said sweep-barrier element defining apertures for the passage of eggs therethrough but which prevent the passage of poultry therethrough;
(d) guide means mounted to extend in an upwardly and forwardly path from the rear of said chamber toward the open front thereof;
(e) means mounting the rear end of said sweep-barrier element, adjacent the rear of said chamber, for movement along the path of said guide means; and
(f) means connected to said guide means to produce a bouncing motion to said sweep-barrier element when the rear end of said element moves to the general upward forward end of said guide means.

9. A poultry nest comprising:

(a) opposite side, rear, and nest-forming bottom walls which cooperate to define a nesting chamber having an open front;
(b) a sweep-barrier element extending between said side walls and generally overlying said nest-forming bottom wall, said sweep-barrier element having an egg passage aperture therethrough, said egg passage aperture being of a size to prevent the passage of poultry therethrough; and
(c) means mounting said sweep-barrier element for combined and translational and compound movement to a generally upright position adjacent the open front of said chamber and where at least a portion of said sweep-barrier element extends outside of the open front of said chamber.

10. A poultry nest comprising:
(a) opposite side, rear, and nest-forming bottom walls which cooperate to define a nesting chamber having an open front;
(b) a sweep-barrier element extending between the side walls of said chamber and generally overlying the nest-forming bottom wall;
(c) said sweep-barrier element defining apertures for the passage of eggs therethrough but which prevent the passage of poultry therethrough; means for imparting translational movement to said sweep-barrier element; and
(d) means connected to said sweep-barrier element to limit forward translational movement of said sweep-barrier element until said element has moved at least to a predetermined position; and
(e) said translational imparting means including drive means connected to the rear end of said sweep-barrier element, adjacent the rear of said chamber, and extending in an upwardly and forwardly direction from the rear of said chamber toward the open front thereof, said drive means periodically moving the rear end of said element from a first position, generally overlying said nest-forming bottom wall, to a second position, forming a barrier at the open front of said chamber, and periodically returning said element to its first position.

11. A poultry nest comprising:
(a) opposite side, rear, and nest-forming bottom walls which cooperate to define a nesting chamber having an open front, said nest-forming bottom wall tilting toward a marginal delivery edge thereof adjacent the open front of said chamber;
(b) an egg collection structure mounted adjacent the delivery edge of said nest-forming bottom wall, said egg collection structure having a cover which partially blocks the open front of said chamber;
(c) a sweep-barrier element extending between the side walls of said chamber and generally overlying the nest-forming bottom wall, the front end of said sweep-barrier element adjacent the open front of said chamber extending angularly upwardly and overlying the cover of said egg collection structure;
(d) said sweep-barrier element defining apertures for the passage of eggs therethrough but which prevent the passage of poultry therethrough;
(e) a drive means mounted adjacent the upper open front of said chamber, said drive means including a first rotatable take-up wheel having a predetermined peripheral circumference, and a second rotatable take-up wheel having a peripheral circumference less than the circumference of said first take-up wheel;
(f) a first flexible connecting means having one end connected to the rear end of said sweep-barrier element, adjacent the rear of said chamber, and having another end wound around and connected to said first take-up wheel so that rotation of said first take-up wheel in a first direction causes said first flexible connecting means to wind up on said wheel while rotation of said first take-up wheel in an opposite direction causes first flexible connecting means to unwind therefrom; and
(g) a second flexible connecting means having one end connected to the front end of said sweep-barrier element, and having another end wound around and connected to said second take-up wheel so that rotation of said second take-up wheel in said first direction causes said second flexible connecting means to unwind from said second wheel while rotation of said second wheel in an opposite direction causes said second flexible connecting means to wind up thereon.

12. A poultry nest comprising:
(a) opposite side, rear, and nest-forming bottom walls which cooperate to define a nesting chamber having an open front, said nest-forming bottom wall tilting toward a marginal delivery edge thereof adjacent the open front of said chamber;
(b) an egg collection structure mounted adjacent the delivery edge of said nest-forming bottom wall, said egg collection structure having a cover which partially blocks the open front of said chamber;
(c) a sweep-barrier element extending between the side walls of said chamber and generally overlying the nest-forming bottom wall, the front end of said sweep-barrier element adjacent the open front of said chamber extending angularly upwardly and overlying the cover of said egg collection structure;
(d) said sweep-barrier element defining apertures for the passage of eggs therethrough but which prevent the passage of poultry therethrough;
(e) guide means mounted to extend in an upwardly and forwardly path from the rear of said chamber toward the open front thereof;
(f) means mounting the rear end of said sweep-barrier element, adjacent the rear of said chamber, for movement along the path of said guide means;
(g) drive means connected to said sweep-barrier element to periodically move the rear end of said element along the path of said guide means from a first position, generally overlying said nest-forming bottom wall, to a second position, forming a barrier at the open front of said chamber, and to periodically return said element to its first position; and
(h) means connected to said sweep-barrier element and said nest-forming bottom wall to increase the angle of tilt of said nest-forming bottom wall as said sweep-barrier element moves from its first position to its second position so that eggs on said bottom wall will roll into said egg collection structure.

13. A poultry nest comprising:
(a) opposite side, rear, and nest-forming bottom walls which cooperate to define a nesting chamber having an open front, said nest-forming bottom wall tilting toward a marginal delivery edge thereof;
(b) an egg collection structure mounted adjacent the delivery edge of said nest-forming bottom wall;
(c) a sweep-barrier element extending between the side walls of said chamber and generally overlying the nest-forming bottom wall;
(d) said sweep-barrier element defining apertures for the passage of eggs therethrough but which prevent the passage of poultry therethrough;
(e) drive means connected to said sweep-barrier element to periodically move said element from a first position, generally overlying said nest-forming bottom wall, to a second position, forming a barrier at the open front of said chamber, and to periodically return said element to its first position; and
(f) means connected to said sweep-barrier element and said nest-forming bottom wall to increase the angle of tilt of said nest-forming bottom wall as said sweep-barrier element moves from its first position to its second position so that eggs on said bottom wall will roll into said egg collection structure.

14. A poultry nest comprising:
(a) opposite side, rear, and nest-forming bottom walls which cooperate to define a nesting chamber having an open front;
(b) a sweep-barrier element extending between the side walls of said chamber and generally overlying the nest-forming bottom wall;
(c) said sweep-barrier element defining apertures for the passage of eggs therethrough but which prevent the passage of poultry therethrough;
(d) means connected to said sweep-barrier element to periodically move said element from a first position, generally overlying said nest-forming bottom wall, to a second position, forming a barrier at the open front of said chamber, and to periodically return said element to its first position; and
(e) guide means having means to produce a series of bouncing motions to said sweep-barrier element when said element moves to its second, barrier forming, position.

15. A poultry nest comprising:
(a) opposite side, rear, and nest-forming bottom walls which cooperate to define a nesting chamber having an open front;
(b) a sweep-barrier element extending between the side walls of said chamber and generally overlying the nest-forming bottom wall;
(c) said sweep-barrier element defining apertures for the passage of eggs therethrough but which prevent the passage of poultry therethrough; and
(d) means connected to impart an upward and forward translational motion to said sweep-barrier element, said upward motion being at a greater rate than said forward motion.

16. A poultry nest comprising:
(a) opposite side, rear, and nest-forming bottom walls which cooperate to define a nesting chamber having an open front;
(b) a sweep-barrier element extending between the side walls of said chamber and generally overlying the nest-forming bottom wall;
(c) said sweep-barrier element defining apertures for the passage of eggs therethrough but which prevent the passage of poultry therethrough;
(d) a drive means mounted adjacent the upper open front of said chamber, said drive means including a first rotatable take-up wheel having a predetermined peripheral circumference, and a second rotatable take-up wheel having a peripheral circumference less than the circumference of said first take-up wheel;
(e) a first flexible connecting means having one end connected to the rear end of said sweep-barrier element, adjacent the rear of said chamber, and having another end wound around and connected to said first take-up wheel so that rotation of said first take-up wheel in a first direction causes said first flexible connecting means to wind up on said wheel while rotation of said first take-up wheel in an opposite direction causes first flexible connecting means to unwind therefrom; and
(f) a second flexible connecting means having one end connected to the front end of said sweep-barrier element, and having another end wound around and connected to said second take-up wheel so that rotation of said second take-up wheel in said first direction causes said second flexible connecting means to unwind from said second wheel while rotation of said second wheel in an opposite direction causes said second flexible connecting means to wind up thereon.

17. A poultry nest comprising:
(a) opposite side, rear, and nest-forming bottom walls which cooperate to define a nesting chamber having an open front;
(b) a sweep-barrier element extending between the side walls of said chamber and generally overlying the nest-forming bottom wall;
(c) said sweep-barrier element defining apertures for the passage of eggs therethrough but which prevent the passage of poultry therethrough;
(d) drive means for imparting translational movement to said sweep-barrier element and connected to the rear end of said sweep-barrier element, adjacent the rear of said chamber, and extending in an upwardly and forwardly direction from the rear of said chamber toward the open front thereof, said drive means periodically moving the rear end of said element from a first position, generally overlying said nest-forming bottom wall, to a second position, forming a barrier at the open front of said chamber, and periodically returning said element to its first position; and
(e) means limiting forward translational movement of said sweep-barrier element until said element has moved at least through a predetermined angle.

18. A poultry nest comprising:
(a) opposite side, rear, and nest-forming bottom walls which cooperate to define a nesting chamber having an open front, said nest-forming bottom wall tilting toward a marginal delivery edge thereof adjacent the open front of said chamber;
(b) an egg collection structure mounted adjacent the delivery edge of said nest-forming bottom wall, and partially blocking the open front of said chamber;
(c) a sweep-barrier element extending between the side walls of said chamber and generally overlying the nest-forming bottom wall, the front end of said sweep-barrier element adjacent the open front of said chamber extending angularly upwardly and overlying said egg collection structure;
(d) said sweep-barrier element defining apertures for the passage of eggs therethrough but which prevent the passage of poultry therethrough;
(e) guide means mounted to extend in an upwardly and forwardly path from the rear of said chamber toward the open front thereof;
(f) means mounting the rear end of said sweep-barrier element, adjacent the rear of said chamber, for movement along the path of said guide means; and
(g) drive means connected to said sweep-barrier element to periodically move the rear end of said element along the path of said guide means from a first position, generally overlying said nest-forming bottom wall, to a second position, forming a barrier at the open front of said chamber, and to periodically return said element to its first position.

References Cited by the Examiner

UNITED STATES PATENTS 3,234,909  2/1966  Graves et al. _____ 119—45

ALDRICH F. MEDBERY, *Primary Examiner.*